United States Patent
Redfern et al.

(10) Patent No.: US 7,342,937 B2
(45) Date of Patent: Mar. 11, 2008

(54) SPECTRALLY FLEXIBLE BAND PLANS WITH REDUCED FILTERING REQUIREMENTS

(75) Inventors: Arthur J. Redfern, Plano, TX (US); Georgios Ginis, Mountain View, CA (US); Fernando A. Mujica, Allen, TX (US); Krista S. Jacobsen, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/070,476

(22) Filed: Mar. 2, 2005

(65) Prior Publication Data
US 2005/0232540 A1    Oct. 20, 2005

Related U.S. Application Data

(60) Provisional application No. 60/550,455, filed on Mar. 5, 2004.

(51) Int. Cl.
*H04J 4/00* (2006.01)
(52) U.S. Cl. .................................. 370/436; 379/399.01
(58) Field of Classification Search ................................ 379/399.01–413.04
See application file for complete search history.

(56) References Cited

U.S. PATENT DOCUMENTS

| | | | | |
|---|---|---|---|---|
| 4,521,728 | A * | 6/1985 | Li | 324/638 |
| 4,891,614 | A * | 1/1990 | De Ronde | 333/122 |
| 2002/0141440 | A1* | 10/2002 | Stanley et al. | 370/465 |
| 2002/0169585 | A1* | 11/2002 | Jones et al. | 702/189 |
| 2002/0186714 | A1* | 12/2002 | Mestdagh | 370/480 |
| 2002/0186715 | A1* | 12/2002 | Mestdagh | 370/480 |
| 2003/0063659 | A1* | 4/2003 | Kaltiainen et al. | 375/222 |
| 2003/0086514 | A1* | 5/2003 | Ginis et al. | 375/346 |

OTHER PUBLICATIONS

Mestdagh, "Zipper VDSL: A Solution for Robust Duplex Communication Telephone Lines". 2000, IEEE Communications Magazine, May 2000.*
Debbasch et al, "Modified Flexible bandplan 998 for variable rate Symmetric VDSL Applications" 2003, IEEE P802.3ah Copper, Seoul, May 12-15, 2003.*
USPTO "Interim Guidelines for Examination of Patent Applications for Patent Subject Matter Eligibility", pp. 16-30.*
Boets et al "Measurement, Calibration and Pre-Processing of Signals for Single-Ended Subscriber Line Identification", IMTC-2003, Instrumentation and Measurement Technology Conf.; Vail, CO, USA, May 20-22, 2003].*

* cited by examiner

Primary Examiner—Ramnandan Singh
(74) Attorney, Agent, or Firm—Steven A. Shaw; W. James Brady; Frederick J. Telecky, Jr.

(57) ABSTRACT

The present invention provides, in one embodiment, a method of simplifying filtering with respect to a band plan. The method includes selecting a reflection point relative to the band plan and designating subchannels as unusable within a filterable separation of the reflection point that would otherwise introduce an asymmetry within the filterable separation. The present invention also provides a filtering simplifier for use with a DSL system having a band plan. The filtering simplifier includes a reflection point selector configured to select a reflection point relative to the band plan. The filtering simplifier also includes a subchannel designator coupled to the reflection point selector and configured to designate subchannels as unusable within a filterable separation of the reflection point that would otherwise introduce an asymmetry within the filterable separation.

15 Claims, 7 Drawing Sheets

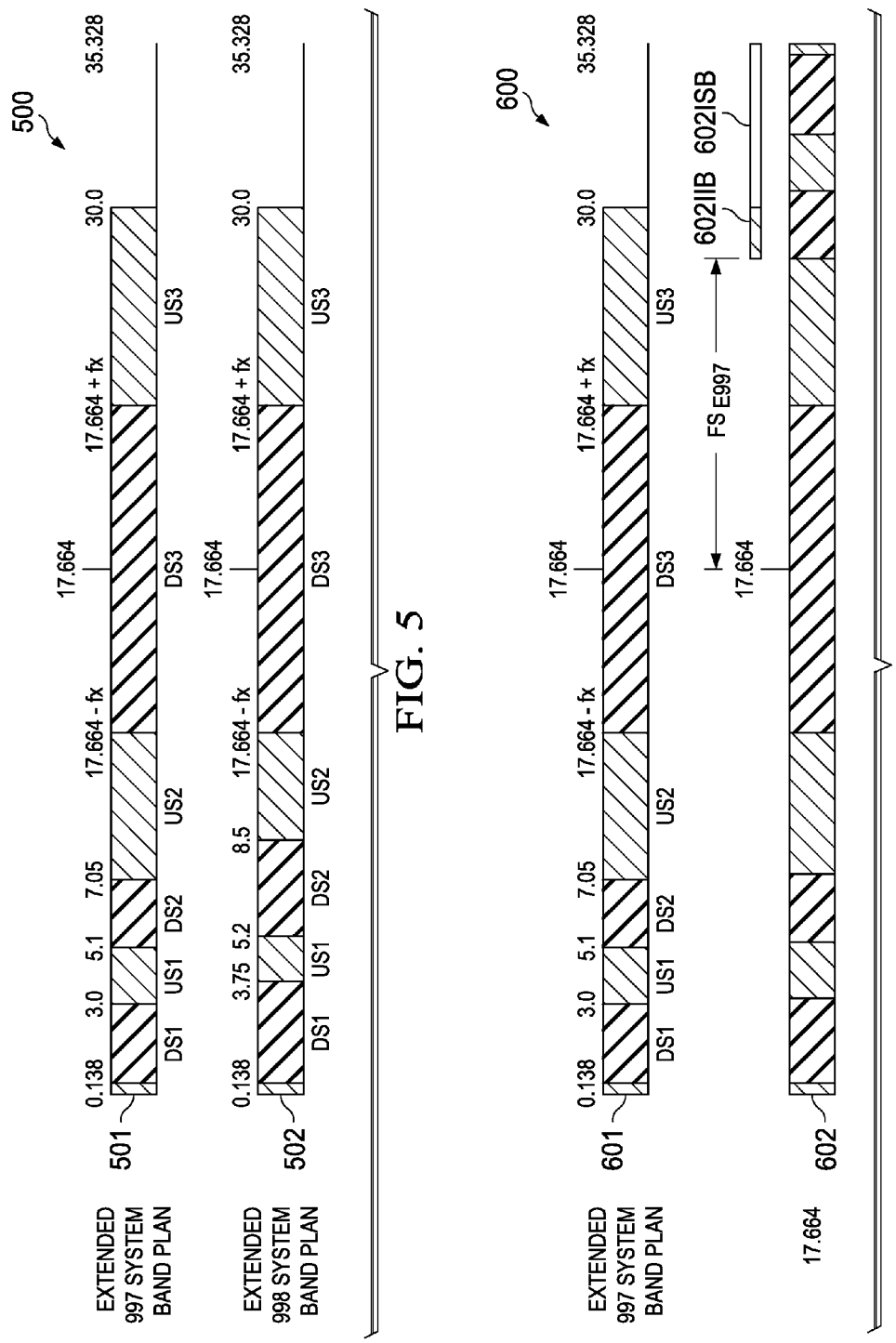

SPECTRALLY FLEXIBLE BAND PLANS WITH REDUCED FILTERING REQUIREMENTS

CROSS-REFERENCE TO PROVISIONAL APPLICATION

This application claims the benefit of U.S. Provisional Application No. 60/550455 entitled "Spectrally Flexible Band Plans With Reduced Filtering Requirements" to Arthur J. Redfern, et al., filed on Mar. 05, 2004, which is incorporated herein by reference in its entirety.

TECHNICAL FIELD OF THE INVENTION

The present invention is directed, in general, to a communication system and, more specifically, to an image band coordinator, a method of image band coordination and a very high data rate digital subscriber line (VDSL) system employing the coordinator or the method.

BACKGROUND OF THE INVENTION

A digital subscriber line (DSL) system may transport high-bandwidth data, such as multimedia and video, within a communication network. DSL systems typically employ twisted-pair telephone lines to transmit and receive data. Transmission distance over the twisted-pair telephone lines is inversely proportional to data rate and typically ranges from about 1000 feet for higher data rates up to several miles for lower ones. The general term DSL is used to cover a variety of similar system implementations, which have the ability to deliver high-bandwidth data rates to dispersed locations with relatively small changes in existing communication infrastructure.

A DSL system employs a transmission unit, having both transmit and receive capability, at a central office location associated with a service provider (central office equipment) and a transmission unit at a remote end location associated with a service subscriber (customer premises equipment). A VDSL1 system may define several system bandwidth options based on the inverse discrete Fourier transform (IDFT) size (parameter n corresponding to the number of subchannels employed) and the subchannel spacing (4312.5 Hz or 8625 Hz). Currently compliant systems employ upstream and downstream transmission bands that span 2.208 MHz, 4.416 MHz, 8.832 MHz or 12 MHz. A similar situation (i.e., various system bandwidth options) is also likely for a VDSL2 system.

Crosstalk is a major impairment in DSL telecommunication networks, since it degrades both upstream and downstream data communications thereby lowering effective data rates needed to provide reliable data communication. Crosstalk occurs between different DSL twisted-pair transmission lines when the signal on one twisted-pair cross-couples into another twisted-pair due to their close proximity. Crosstalk may be classified as near-end crosstalk (NEXT) or far-end crosstalk (FEXT). NEXT occurs between signals originating from multiple transmission units at the same end of a DSL pair. Alternatively, FEXT occurs between signals originating from multiple transmission units at the opposite end of a DSL pair.

Discrete multitone modulation (DMT), which is a multi-carrier modulation technique using DFT to create and demodulate each individual carrier, is employed for data transport in most DSL systems. DMT systems form their transmit signal by adding the complex conjugate of the information symbols (frequency domain) to the information symbols before taking the IDFT. This simplifies creating a real signal, but requires that at least a part of a resulting image be removed through filtering to prevent crosstalk generation.

Severe system crosstalk is caused by NEXT where upstream and downstream bands overlap inappropriately (i.e., upstream on downstream or vice versa). If NEXT is caused by the image and occurs close to a reflection point frequency around which the image is formed, filtering requirements for image removal are also severe.

Accordingly, what is needed in the art is a more effective way to reduce the effect of and preferably prevent image-generated NEXT associated with a DSL system.

SUMMARY OF THE INVENTION

To address the above-discussed deficiencies of the prior art, the present invention provides a method of simplifying filtering with respect to a band plan. In one embodiment, the method includes selecting a reflection point relative to the band plan and designating subchannels as unusable within a filterable separation of the reflection point that would otherwise introduce an asymmetry within the filterable separation. The present invention also provides a filtering simplifier for use with a DSL system having a band plan. The filtering simplifier includes a reflection point selector configured to select a reflection point relative to the band plan. The filtering simplifier also includes a subchannel designator coupled to the reflection point selector and configured to designate subchannels as unusable within a filterable separation of the reflection point that would otherwise introduce an asymmetry within the filterable separation.

In another aspect, the present invention provides a method of extending a band plan. The method includes selecting a reflection point relative to the band plan, and causing any bands occurring within a filterable separation of the reflection point to be symmetric thereabout. The present invention also provides a band plan extension generator for use with a DSL system having a band plan. The band plan extension generator includes a reflection point selector configured to select a reflection point relative to extending the band plan, and an extension band adjuster coupled to the reflection point selector and configured to cause any bands occurring within a filterable separation of the reflection point to be symmetric thereabout.

The present invention also provides, in yet another aspect, a method of generating a band plan. The method includes selecting a reflection point and causing transitions between bands occurring within a filterable separation of the reflection point to be symmetric thereabout. In one embodiment, a brand new band plan employs multiple reflection points of interest having bands that are symmetric within appropriate filterable separations of each of the reflection points. The present invention also provides a band plan generator for use with a DSL system. The band plan generator includes a reflection point selector configured to select a reflection point, and a band transition manipulator coupled to the reflection point selector and configured to cause transitions between bands occurring within a filterable separation of the reflection point to be symmetric thereabout.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 5 illustrates a band plan diagram of embodiments of extended 997 and 998 system band plans, which are constructed in accordance with the principles of the present invention;

FIGS. 6A and 6B illustrate band plan family diagrams of embodiments of reflection point band plans corresponding to the extended 997 and 998 system band plans of FIG. 5;

DETAILED DESCRIPTION

Figure 1:
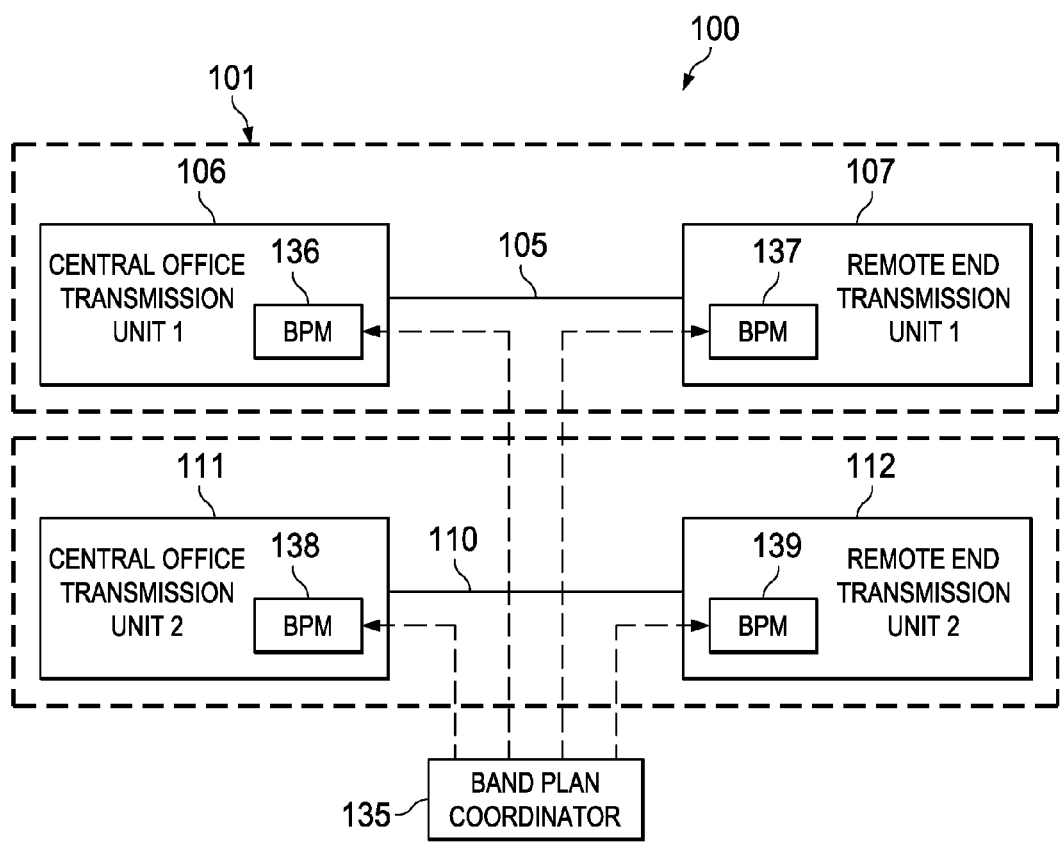
FIG. 1 illustrates a system diagram of an embodiment of a VDSL system employing band plan coordination constructed in accordance with the principles of the present invention.

Referring initially to FIG. 1, illustrated is a system diagram of an embodiment of a VDSL system, generally designated 100, employing band plan coordination constructed in accordance with the principles of the present invention. The VDSL system 100 employs upstream and downstream transmission bands and includes first and second VDSL transmission loops 101, 102 having first and second transmission lines 105, 110. The first transmission loop 101 includes a first central office transmission unit 106 and a first remote end transmission unit 107 coupled to the first transmission line 105. The second transmission loop 102 includes a first central office transmission unit 111 and a second remote end transmission unit 112 coupled to the second transmission line 110. In the illustrated embodiment, the VDSL system employs discrete multitone (DMT) modulation.

The VDSL system 100 also employs a band plan coordinator 135 that communicates band plan information to first, second, third and fourth band plan modem elements (BPM) 136, 137, 138, 139. The band plan coordinator 135 employs a band plan filtering simplifier, a band plan extension generator and a band plan generator to construct a band plan that sufficiently limits NEXT.

The ability to support high symmetric or asymmetric rates on short loops is a goal of VDSL2. While the use of frequencies below 12 MHz has already been specified for the 997 and 998 system band plans, the use of frequencies above 12 MHz are not used and are currently considered to be a stop band. This provides an opportunity to define their use with a system bandwidth of 17.664 MHz or greater (e.g., 4096 subchannels with a 4312.5 Hz spacing or 2048 subchannels with a 8625 Hz spacing). Ideally, frequencies on either side of 17.664 MHz would be used in the same transmission direction, in which case, images above 17.664 MHz fall on bands being used in the same direction (upstream on upstream, downstream on downstream). Therefore, any resulting crosstalk to other systems (if neighboring systems use those frequencies at all) that is not removed by receiver filters appears as FEXT and not NEXT.

Since high transmission rates require large bandwidths, it is often difficult to define a single frequency plan that is well suited to both symmetric and asymmetric rates due to usable bandwidth limitations. In the embodiments that follow, the 997 and 998 system band plans may be extended while providing advantageous characteristics. These characteristics include maintaining spectral compatibility with existing 997 and 998 plans and minimizing upstream and downstream transitions. Also, both symmetric and asymmetric rates may be supported, and filtering requirements for image removal may be appropriately managed.

Figure 2:
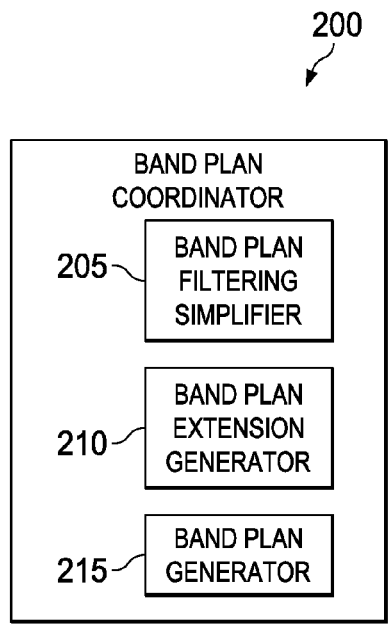
FIG. 2 illustrates a diagram of an embodiment of a band plan coordinator that may be employed with a DSL system as was discussed with respect to FIG. 1.

Turning now to FIG. 2, illustrated is a diagram of an embodiment of a band plan coordinator, generally designated 200, that may be employed with a DSL system as was discussed with respect to FIG. 1 and constructed in accordance with the principles of the present invention. The band plan coordinator 200 includes a band plan filtering simplifier 205, a band plan extension generator 210 and a band plan generator 215.

The band plan filtering simplifier 205 may be employed with an existing band plan. The band plan filtering simplifier 205 includes a reflection point selector configured to select a reflection point relative to the band plan and a subchannel designator coupled to the reflection point selector and configured to designate subchannels as unusable within a filterable separation of the reflection point that would otherwise introduce an asymmetry within the filterable separation.

The reflection point corresponds to a frequency that represents a system bandwidth corresponding to a number of subchannels multiplied by a subchannel frequency spacing. The filterable separation may correspond to a number of unused transmission subchannels that contiguously occupy about 25 percent of the system bandwidth. The filterable separation may also include a portion of a same-direction transmission that corresponds to a relevant neighborhood or portion of the band plan.

The band plan extension generator 210 includes a reflection point selector configured to select a reflection point relative to extending the band plan. The band plan extension generator 210 also includes an extension band adjuster coupled to the reflection point selector and configured to cause any bands occurring within a filterable separation of the reflection point to symmetric about it. Additionally, multiple reflection point extensions may be accommodated, and any of the bands occurring within the filterable separation may be symmetrically adjustable about the reflection point.

The band plan generator 215 also includes a reflection point selector configured to select a reflection point corresponding to a system bandwidth. The band plan generator 215 further includes a band transition manipulator coupled to the reflection point selector and configured to cause transitions between the bands occurring within a filterable separation of the reflection point to be symmetric about the reflection point. It may be noted that placing a transition between bands on a reflection point would cause an "antisymmetry" to occur within the filterable separation of the reflection point. Therefore, a transition between bands may not occur on a reflection point. Additionally, a multiple reflection point band template may be employed that accommodates symmetric adjustment of the transitions between bands thereby allowing different transmission biases.

Figure 3:
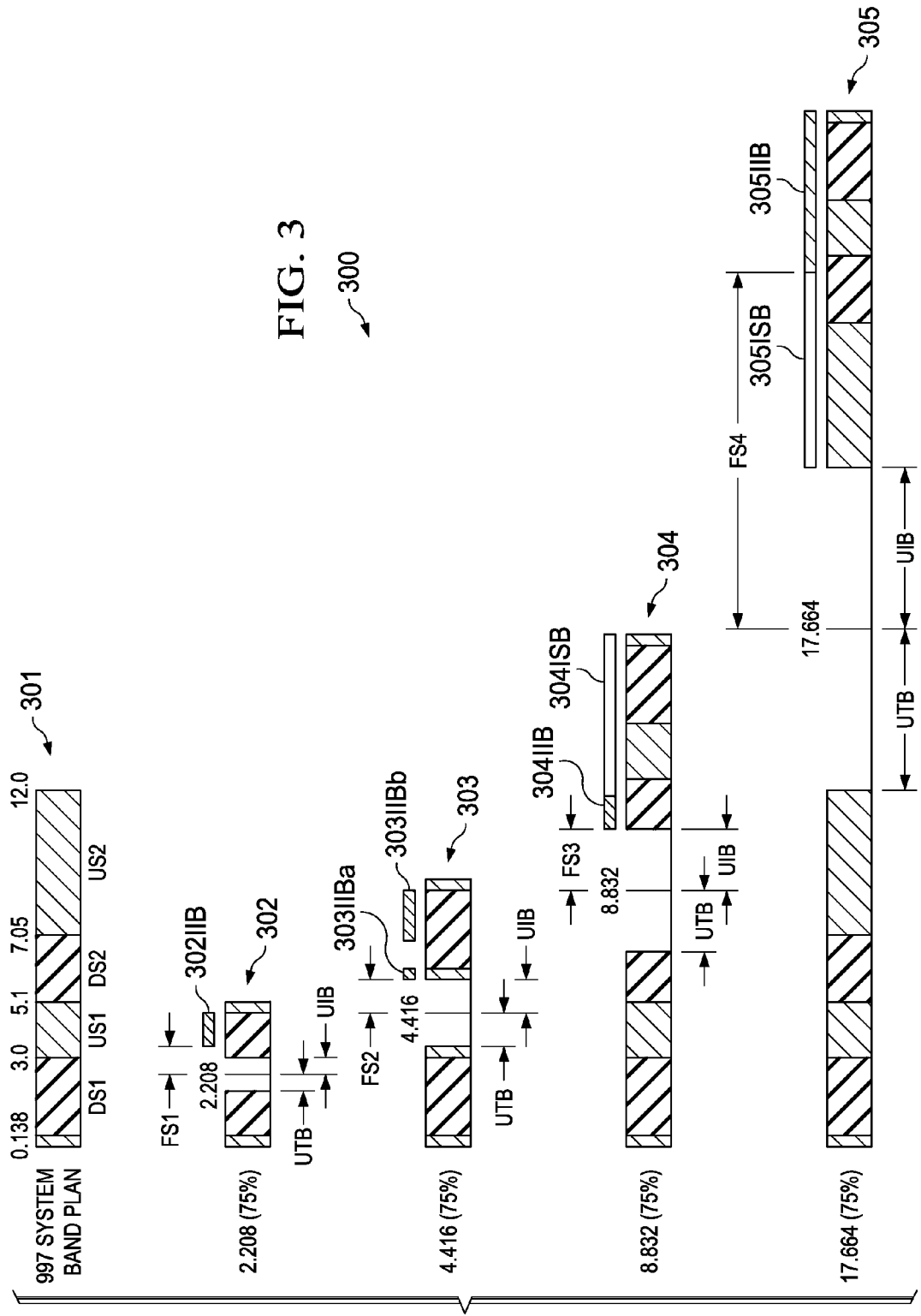
FIG. 3 illustrates a band plan family diagram of an embodiment of reflection point band plans, which is constructed in accordance with the principles of the present invention for an existing 997 system band plan.

Turning now to FIG. 3, illustrated is a band plan family diagram of an embodiment of reflection point band plans, generally designated 300, which is constructed in accordance with the principles of the present invention for an existing 997 system band plan. The band plan family 300 includes the existing 997 system band plan 301 and corresponding first, second, third and fourth reflection point band plans 302, 303, 304, 305. The 997 system band plan 301 includes first and second downstream transmission bands DS1, DS2, first and second upstream transmission bands US1, US2 and a low frequency optional band. Corresponding bandwidth frequencies ranging from DC to 12 MHz are also shown for the 997 system band plan 301.

The first, second, third and fourth reflection point band plans 302, 303, 304, 305 include first, second, third and fourth transmission portions of the 997 system band plan 301, respectively, based on several system bandwidth selections. These transmission portions are shown to the left of corresponding first, second and third reflection point frequencies of 2.208 MHz, 4.416 MHz, 8.832 MHz and 17.664 MHz, which represent the system bandwidth selections. Each of the system bandwidths corresponds to a number of subchannels multiplied by a subchannel frequency spacing.

The first, second, third and fourth reflection point band plans 302, 303, 304, 305 also include first, second, third and fourth image portions, which are the first, second, third and fourth transmission portions reflected around their corresponding reflection point frequencies. Unusable transmission bandwidths UTB and their corresponding unused image bandwidths UIB are shown to be adjacent each of their respective reflection point frequencies. In the illustrated embodiment, the unusable transmission bandwidths UTB represent at least 25 percent of their respective bandwidths and require a corresponding percentage reduction in subchannels employed thereby limiting system capability to no more than 75 percent of system bandwidth. However, one skilled in the pertinent art will understand that other unusable transmission bandwidths UTB may be employed as allowed by a particular application.

Each of the image portions of the reflection point band plans 302, 303, 304, 305 includes at least one image interference band, which are indicated as 302IIB, 303IIBa, 303IIBb, 304IIB and 305IIB in FIG. 3. These image interference bands are created when the image portion has an opposite-direction transmission to a relevant neighborhood of the 997 system band plan 301. The image interference bands provide the severe crosstalk associated with NEXT, if not appropriately filtered.

In the illustrated embodiment, first, second, third and fourth filterable separations FS1, FS2, FS3, FS4 are shown relative to the nearest respective image interference bands 302IIB, 303IIBa, 304IIB, 305IIB. In the illustrated embodiment, the unused image bandwidths UIB create at least a filterable separation thereby providing a minimum filter transition bandwidth that facilitates filtering requirements associated with image interference band filtering. As may be seen from FIG. 3, the unusable transmission bandwidths UTB provide additional filter transition bandwidth. The first filterable separation FS1 also provides additional filter transition bandwidth since its image interference band 302IIB is farther away from its reflection point frequency than its unused image bandwidth UIB. These filter transition bandwidths accommodate filter skirt requirements that allow maintaining transmission bands while allowing appropriate filtering of image interference bands. Filtering for image stop bands 304ISD, 305ISB may also be accommodated if a maximum frequency of 12 MHz is to be maintained in the 997 system band plan 301.

Figure 4:
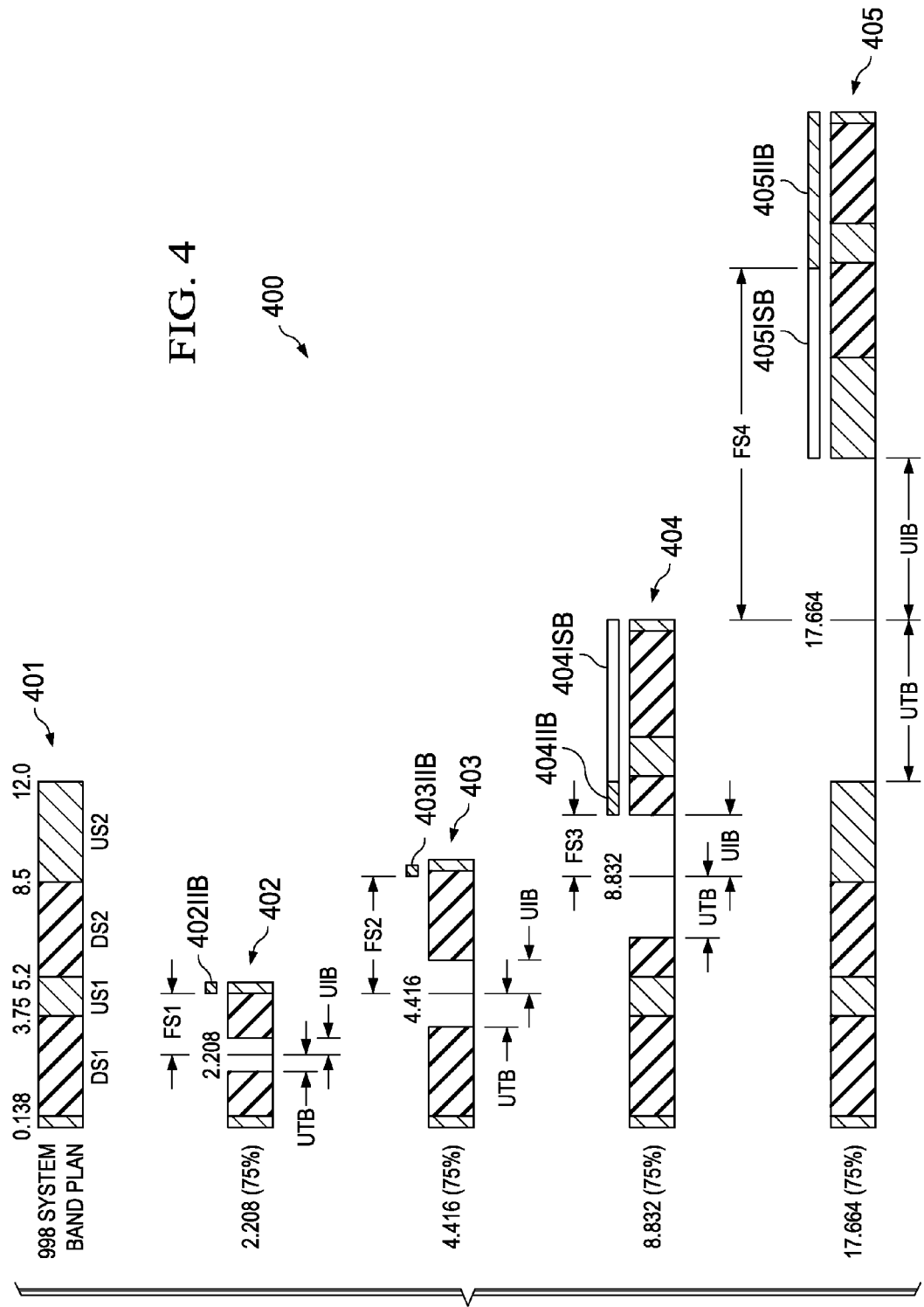
FIG. 4 illustrates a band plan family diagram of an embodiment of reflection point band plans, which is constructed in accordance with the principles of the present invention for an existing 998 system band plan.

Turning now to FIG. 4, illustrated is a band plan family diagram of an embodiment of reflection point band plans, generally designated 400, which is constructed in accordance with the principles of the present invention for an existing 998 system band plan. The band plan family 400 includes the 998 system band plan 401 and corresponding first, second, third and fourth reflection point band plans 402, 403, 404, 405. The 998 system band plan 401 includes first and second downstream transmission bands DS1, DS2, first and second upstream transmission bands US1, US2 and a low frequency optional band, as before. Corresponding bandwidth frequencies ranging from DC to 12 MHz are also shown for the 998 system band plan 401.

The first, second, third and fourth reflection point band plans 402, 403, 404, 405 also include first, second and third transmission portions of the 998 system band plan 401, respectively, based on several system bandwidth selections. These transmission portions are also shown to the left of corresponding first, second, third and fourth reflection point frequencies of 2.208 MHz, 4.416 MHz, 8.832 MHz and 17.664 MHz, which represent the system bandwidth selections. Each of the system bandwidths corresponds to a number of subchannels multiplied by a subchannel frequency spacing, as before. The first, second, third and fourth reflection point band plans 402, 403, 404, 405 also include first, second, third and fourth image portions and unusable transmission bandwidths UTB and their corresponding unused image bandwidths UIB shown adjacent each of their respective reflection point frequencies. The unusable transmission bandwidths UTB again represent at least 25 percent of the transmission bandwidth corresponding to a similar percentage reduction in the number of subchannels employed.

Each of the image portions of the reflection point band plans 402, 403, 404, 405 include a NEXT-generating image interference band, which are indicated as 402IIB, 403IIB, 404IIB and 405IIB in FIG. 4. In the illustrated embodiment, first, second, third and fourth filterable separations FS1, FS2, FS3, FS4 are shown associated with their corresponding reflection point frequencies and the nearest respective image interference bands 402IIB, 403IIB, 404IIB, 405IIB, as before. In the illustrated embodiment, the first, second and fourth filterable separations FS1, FS2, FS4 provide additional filter transition bandwidth over corresponding respective unused image bandwidths ITB. The third filterable separation FS3 is seen to be equal to its respective unused image bandwidth UIB. Again, the filter transition bandwidths benefit from unusable transmission bandwidths UTB to accommodate filter skirt requirements and maintain transmission bands while allowing appropriate filtering of image interference bands. Filtering for image stop bands 404ISD, 405ISD is also accommodated.

Turning now to FIG. 5, illustrated is a band plan diagram of embodiments of extended 997 and 998 system band plans, generally designated 500, which are constructed in accordance with the principles of the present invention. The band plan 500 includes a first extended system band plan 501 corresponding to extending the 997 system band plan and a second extended system band plan 502 corresponding to extending the 998 system band plan.

Each of the first and second extended system band plans 501, 502 includes first and second downstream transmission bands DS1, DS2 and a first upstream transmission band US1 that have bandwidths corresponding to the 997 and 998 standards, respectively. To support higher upstream and downstream rates, two additional bands, one upstream and one downstream, are defined above 12 MHz. Correspondingly, the first and second extended system band plans 501, 502 also include a third downstream transmission band DS3 and second and third upstream transmission bands US2, US3 that employ bandwidths determined by a bandwidth parameter fx.

If the bandwidths of the additional upstream and downstream bands are allowed to vary, both symmetric and asymmetric rates are achievable. Although NEXT at high frequencies restricts neighboring systems from sharing similar frequency division duplex band plans, it may be reasonable to expect that in a limited service area, the performance requirements and channel conditions of neighboring systems will be similar, and thus, the desired frequencies for the upstream and downstream may be similar. In the illustrated embodiment, extending the band definition to 30 MHz seems appropriate since the rules for unintentional radiation in many locations have become more restrictive above that frequency. However, alternative embodiments may employ higher frequencies as allowed by a particular application.

The bandwidth parameter fx is chosen to achieve the desired symmetric or asymmetric rate combination depending on the channel conditions and system requirements. If the bandwidth parameter fx is selected to be no greater than 5.664 MHz, then compatibility with the top of the original second upstream transmission band US2 (i.e., 12 MHz) is maintained. Note that even though the bandwidths of the second and third upstream transmission bands US2, US3 and the third downstream transmission band DS3 vary with the choice of the bandwidth factor fx, the symmetry of the bands around a reflection point frequency of 17.664 MHz is maintained. This reflection point frequency corresponds to 4096 subchannels with a 4312.5 Hz spacing or 2048 subchannels with a 8625 Hz spacing.

In the illustrated embodiment, if the bandwidth parameter fx is restricted to a range of 0<fx<5.664 MHz, a maximum upstream weighted partitioning exists for the bandwidth parameter fx equal to zero. This partitioning allows the second upstream transmission band US2 to be combined with the third upstream transmission band US3 to form a continuous upstream transmission band from 7.05 or 8.5 MHz to 30 MHz. Alternatively, a maximum downstream weighted partitioning exists for the bandwidth parameter fx equal to 5.664 MHz. This partitioning allows the third downstream transmission band DS3 to span from 12 to 23.328 MHz and the third upstream transmission band US3 to span from 23.328 to 30 MHz. The bandwidth parameter fx is chosen such that the desired symmetric or asymmetric rate is achieved.

To allow an additional safeguard for operators, the range of the bandwidth factor fx (and therefore allowable band plans) may be specified in a management element and set in a VDSL transmission unit at the optical network unit (VTU-O). This would minimize or limit the possibility of NEXT degrading the performance of neighboring systems. The third downstream transmission band DS3 as well as part of the second and third upstream transmission bands US2, US3 are symmetric about 17.664 MHz thereby minimizing the filtering requirements for image removal when the system bandwidth is 17.664 MHz.

Figure 6B:
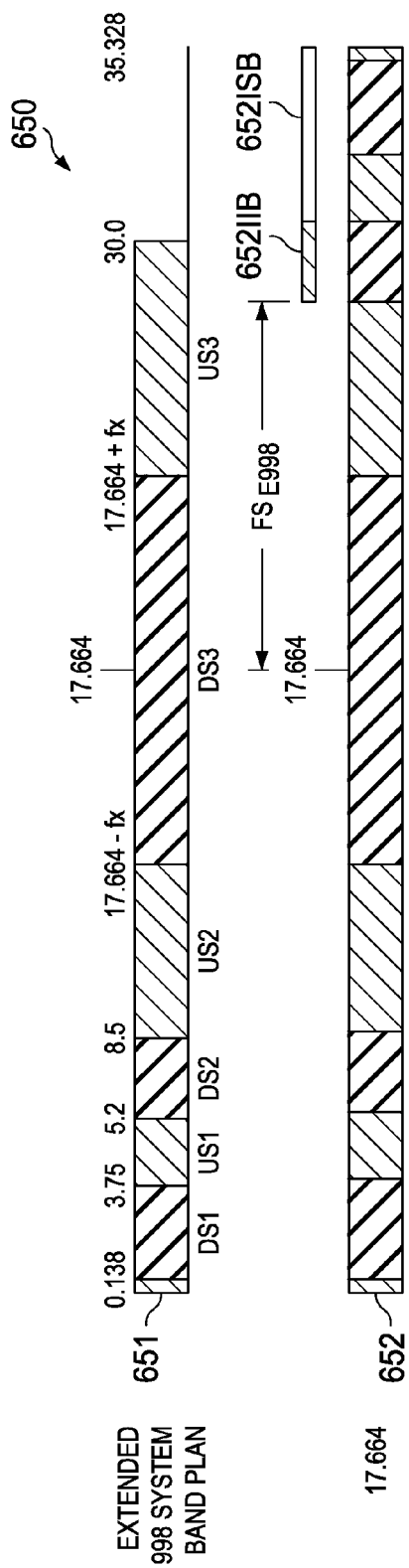

Turning now to FIGS. 6A and 6B, illustrated are band plan family diagrams of embodiments of reflection point band plans, generally designated 600, 650, corresponding to the extended 997 and 998 system band plans of FIG. 5. The band plan family 600 includes the extended 997 system band plan 601 and its corresponding 997 reflection point band plan 602 having a 997 image interference band 602IIB and a 997 image stop band 602ISB. Similarly, the band plan family 650 includes the extended 998 system band plan 651 and its corresponding 998 reflection point band plan 652 having a 998 image interference band 652IIB and a 998 image stop band 652ISB.

The 997 image interference band 602IIB has a 997 filterable separation $FS_{E997}$ that is about 50 percent of its image bandwidth. Similarly, the 998 image interference band 652IIB has a 998 image interference band 652IIB that is also about 50 percent of its image bandwidth. Each of these conditions facilitates filtering of both the respective image interference and stop bands. Therefore, it may be seen that maintaining the symmetry of the third downstream transmission band DS3 around the reflection point frequency 17.664 MHz provides a trade-off capability between filterable separation and bandwidth of the transmission band.

Figure 7:
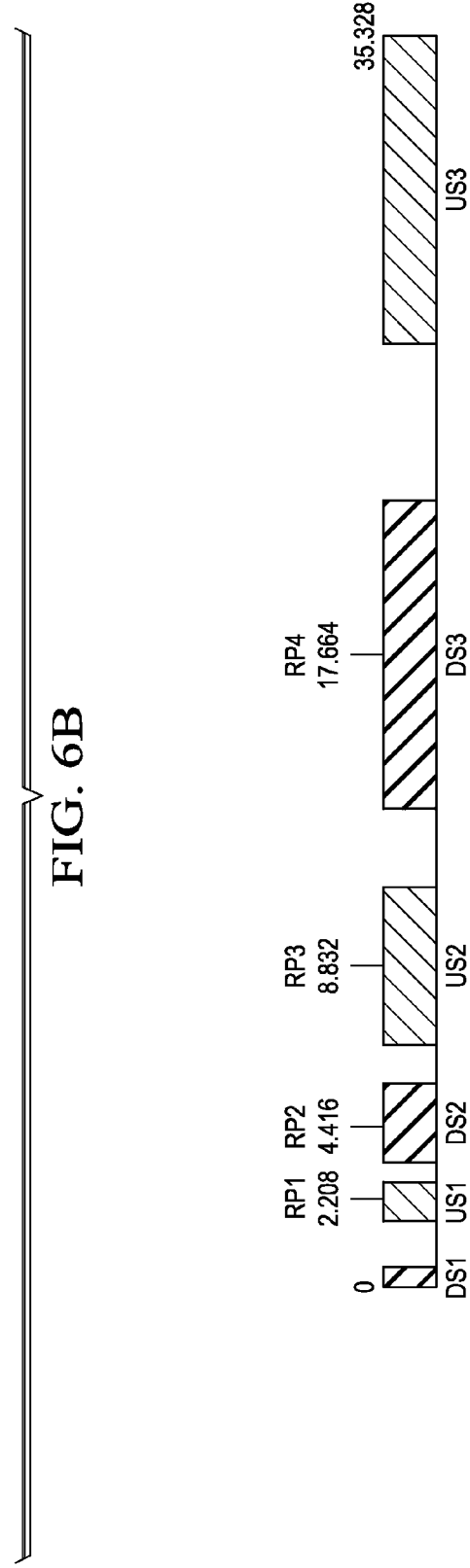
FIG. 7 illustrates a diagram of an embodiment of a multiple reflection point band template, which is constructed in accordance with the principles of the present invention.

Turning now to FIG. 7, illustrated is a diagram of an embodiment of a multiple reflection point band template, generally designated 700, which is constructed in accordance with the principles of the present invention. The multiple reflection point band template 700 includes first, second and third downstream transmission bands DS1, DS2, DS3 and first, second and third upstream transmission bands US1, US2, US3. Additionally, the multiple reflection point band template 700 also includes first, second, third and fourth reflection point frequencies RP1, RP2, RP3, RP4, wherein the reflection point frequencies correspond to system bandwidths, as before.

In the illustrated embodiment, the first and second upstream transmission bands US1, US2 are symmetric around the first and third reflection point frequencies RP1, RP3, respectively. Additionally, the second and third downstream transmission bands DS2, DS3 are symmetric around the second and fourth reflection point frequencies RP2, RP4, respectively. The bandwidth of each of the upstream and downstream transmission bands US1, US2, DS2, DS3 shown are established to provide at least a starting point for filterable separation from each of the corresponding multiple reflection point frequencies RP1, RP2, RP3, RP4. These transmission bands may then be expanded as appropriate to a required system band plan employing different biases such as symmetric or asymmetric and downstream or upstream while remaining "filter friendly" around desired reflection point frequencies.

Figure 8:
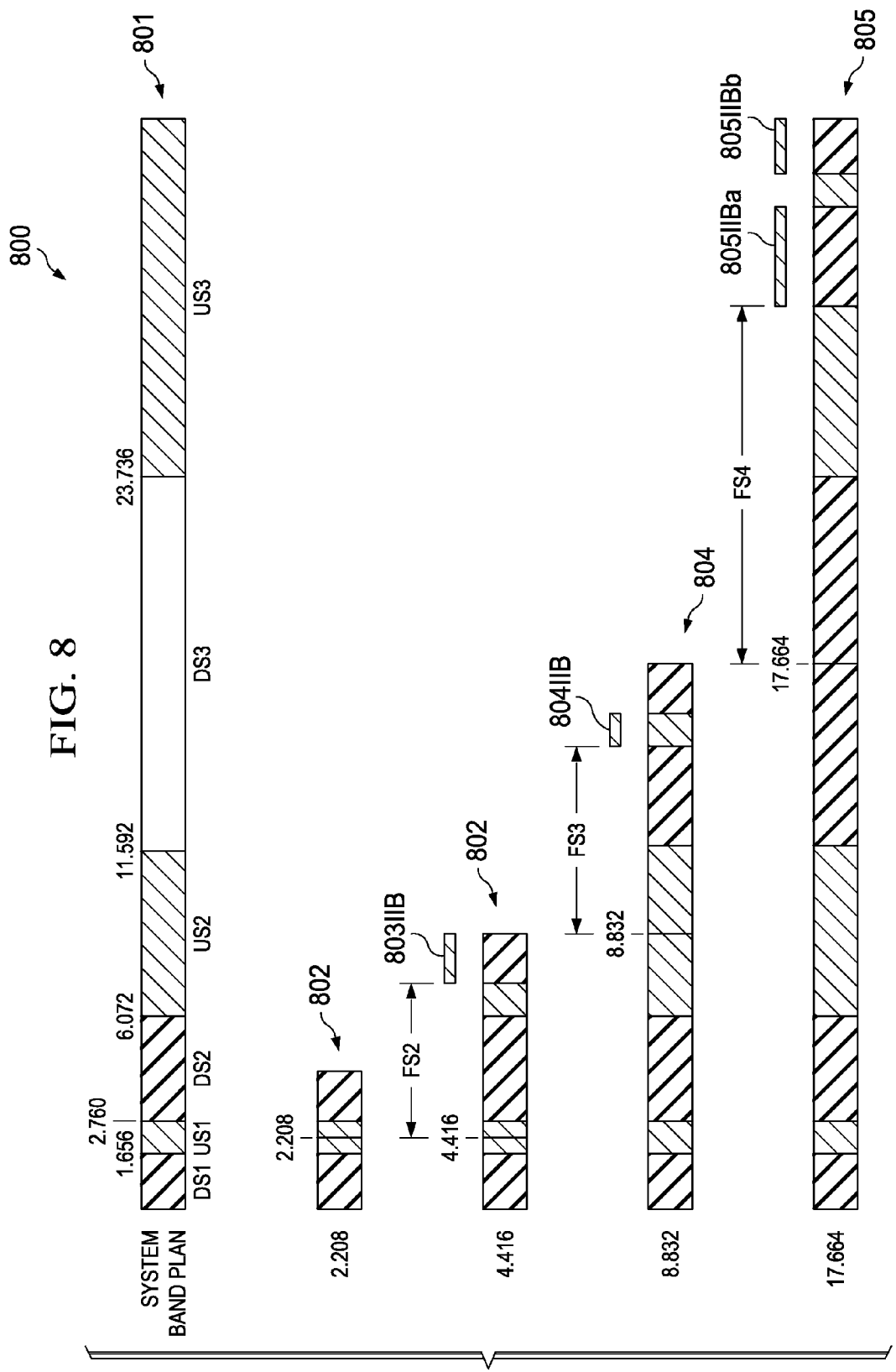
FIG. 8 illustrates a band plan family diagram of an embodiment of reflection point band plans for a new band plan, which is constructed in accordance with the principles of the present invention.

Turning now to FIG. 8, illustrated is a band plan family diagram of an embodiment of reflection point band plans, generally designated 800, for a new band plan which is constructed in accordance with the principles of the present invention. The band plan family 800 was constructed employing a multiple reflection point band template as discussed with respect to FIG. 8 and includes a system band plan 801 and corresponding first, second, third and fourth reflection point band plans 802, 803, 804, 805. The system band plan 801 includes first, second and third downstream transmission bands DS1, DS2, DS3 and first, second and third upstream transmission bands US1, US2, US3.

The first, second, third and fourth reflection point band plans 802, 803, 804, 805 include first, second, third and fourth transmission portions based on several bandwidth selections. They are shown to the left of corresponding first, second, third and fourth reflection point frequencies of 2.208 MHz, 4.416 MHz, 8.832 MHz and 17.664 MHz, which represent the system bandwidth selections. Each of these bandwidth selections corresponds to a number of subchannels multiplied by a subchannel frequency spacing, as discussed earlier.

The first, second, third and fourth reflection point band plans 802, 803, 804, 805 also include first, second, third and fourth image portions, which are the first, second and third transmission portions reflected around their corresponding reflection point frequencies, as also discussed before. In the illustrated embodiment, the first reflection point band plan 802 does not contain an image interference band that requires filtering. However, each of the image portions of the reflection point band plans 803, 804, 805 includes at least one image interference band and is indicated as 803IIB, 804IIB, 805IIBa and 805IIBb, in FIG. 8.

As discussed before, these image interference bands represent an opposite-direction transmission to a relevant neighborhood portion of the system band plan 801 and therefore would provide severe crosstalk in the form of NEXT, if not appropriately filtered. In the illustrated embodiment, first, second and third filterable separations FS2, FS3, FS4 are shown between their corresponding reflection point frequencies and the nearest respective image interference bands 803IIB, 804IIB, 805IIBa.

The filterable separations FS2, FS3, FS4 may be seen to be at least 50 percent of the image bandwidth and provide adequate spacing to facilitate required filtering of the image interference bands. Therefore, the system band plan 801, employing a multiple reflection point band template for its development and using all of the available subchannels, provides image interference filtering requirements that are equal to or less than the 997 and 998 system band plans restricted to 75 percent of available subchannels. Of course, other embodiments of system band plans employing the multiple reflection point band template may be developed that exhibit acceptable image interference filtering requirements, as well.

Figure 9:
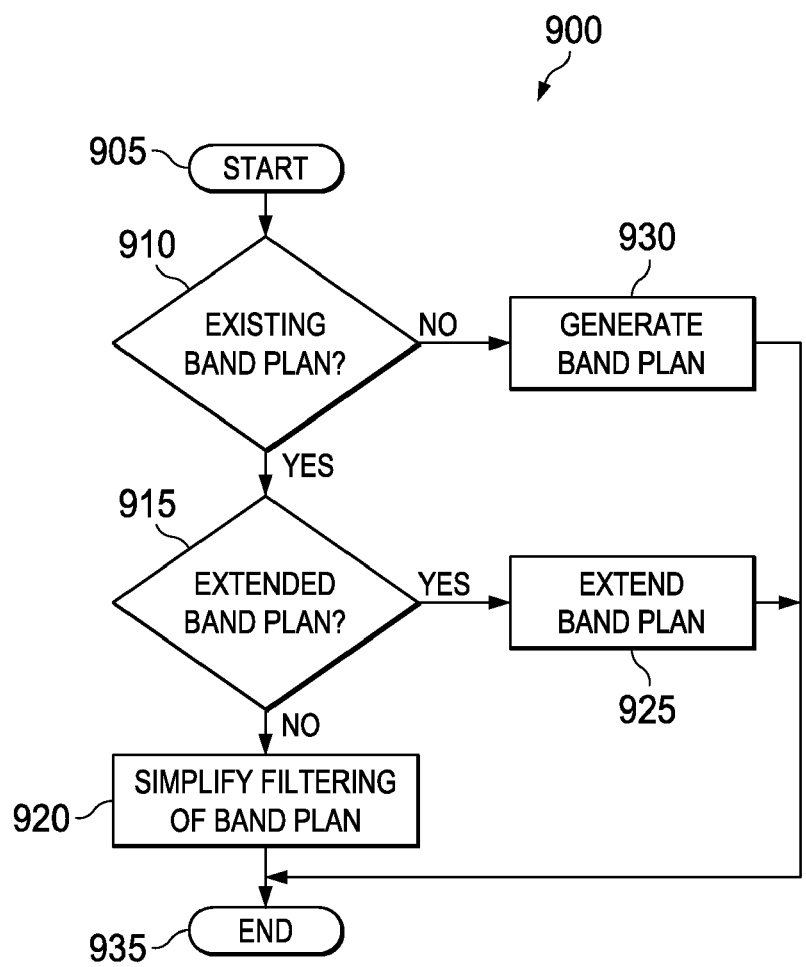
FIG. 9 illustrates a flow diagram employing methods of band plan coordination carried out in accordance with the principles of the present invention.

Turning now to FIG. 9, illustrated is a flow diagram employing methods of band plan coordination, generally designated 900, carried out in accordance with the principles of the present invention. The methods 900 start in a step 905 with an intent to simplify filtering of an existing band plan, extend an existing band plan or generate a new band plan associated with a DSL system. Then, in a first decisional step 910, it is determined if there is an existing system band plan for the DSL system. If there is an existing system band plan, a second decisional step 915 determines if the existing system band plan is to be extended. If the existing system band plan is not to be extended, a method of simplifying filtering with respect to the existing system band plan is employed in a step 920.

The method of simplifying filtering in the step 920 includes selecting a reflection point relative to the existing system band plan and designating subchannels as unusable within a filterable separation of the reflection point that would otherwise introduce an asymmetry within the filterable separation. The reflection point may one mandated by a standard or it may be selected arbitrarily as appropriate to a particular application. The filterable separation may consist entirely of subchannels designated as unusable corresponding to at least 25 percent of a transmission bandwidth. Alternatively, it may also include a same-direction transmission as a relevant neighborhood of the system band plan, which would generate a less severe FEXT. Embodiments of the method of simplifying filtering of an existing system band plan were illustrated with respect to FIGS. 3 and 4. The method of simplifying filtering ends in a step 935.

If it is decided to extend the existing system band plan in the second decisional step 915, a method of extending the system band plan is employed in a step 925. The method of extending the system band plan includes selecting a reflection point relative to the system band plan and causing any bands occurring within a filterable separation of the reflection point to be symmetric about it. The method of extending in the step 925 includes any of the bands occurring within the filterable separation to be symmetrically adjustable about the reflection point, which may also be mandated by a specification or be selected arbitrarily. A repeating of the selecting and the causing discussed earlier with respect to the step 925 may be employed to yield a extended system band plan having multiple extended reflection points. An embodiment of a single reflection point extension was discussed with respect to FIGS. 5, 6A and 6B. The method of extending a band plan again ends in the step 935.

If the first decisional step 910 determines that there is no existing system band plan, a method of generating a band plan is employed in a step 930. The method of generating a band plan includes selecting a reflection point and causing transitions between bands occurring within a filterable separation of the reflection point to be symmetric about it. The method of generating a band plan may also employ a multiple reflection point band template, which is an embodiment of repeating the selecting and the causing discussed above, that was illustrated with respect to FIGS. 7 and 8. The method of generating a band plan includes having multiple transitions between bands that are symmetrically adjustable about a reflection point thereby accommodating different transmission biases. The method of band plan generation ends in the step 935.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps is not a limitation of the present invention.

In summary, embodiments of the present invention employing various band plan scenarios have been presented. Advantages of these embodiments include the accommodation of both symmetric and asymmetric rates wherein upstream and downstream transitions are minimized. Spectral compatibility with existing 997 and 998 system band plans may be maintained, and filter-friendly requirements for removal of image interference bands were provided.

For systems using 12 MHz or less bandwidth where the 997 and 998 system band plans are already defined, guidelines for limiting the number of subchannels relative to half the IDFT size were provided. Extensions to the 997 and 998 system band plans were presented wherein the power spectral density in the neighborhood of a 17.664 MHz reflection point was maintained in a symmetric fashion. A bandwidth parameter fx was introduced that allows the band plan to support symmetric and asymmetric rates while allowing filterable separations for image interference bands. Additionally, a band plan generation method including multiple reflection point frequencies was provided that allows for the construction of filter-friendly band plans. As was noted earlier, placing a transition between bands on a reflection point would cause an anti-symmetry to occur within a filterable separation of the reflection point. Therefore, a transition between bands may not occur on a reflection point.

Of course, one skilled in the art will recognize that the embodiments of the present invention related to the 997 and 998 system band plans are exemplary, and that the principles of the present invention may be employed to accommodate other DSL band plan requirements. Additionally, those skilled in the art should also understand that they can make various changes, substitutions and alterations herein without departing from the spirit and scope of the invention in its broadest form.

What is claimed is:

1. A method of providing a band plan with reduced filtering requirements for a communications system, comprising:
    selecting a reflection point relative to said band plan; and
    designating subchannels as unusable within a filterable separation of said reflection point that would otherwise introduce an asymmetry within said filterable separation for removing images in said communications system to yield said band plan for communicating in said communications system.

2. The method as recited in claim 1 further comprising repeating said selecting and said designating to yield a band plan having multiple reflection points.

3. The method as recited in claim 1 wherein said reflection point is selected based on a digital subscriber line transmission standard.

4. The method as recited in claim 1 wherein said filterable separation corresponds to at least 25 percent of a transmission bandwidth.

5. The method as recited in claim 1 wherein said filterable separation includes a same-direction transmission as a relevant neighborhood of said band plan.

6. A filtering simplifier for providing a band plan with reduced filtering requirements for a DSL system, comprising:
    a reflection point selector configured to select a reflection point relative to said band plan; and
    a subchannel designator coupled to said reflection point selector and configured to filter images for communicating in said DSL system by designating subchannels as unusable within a filterable separation of said reflection point that would otherwise introduce an asymmetry within said filterable separation.

7. A method of extending a band plan to provide a band plan with reduced filtering requirements for communicating in a communications system, comprising:
    selecting a reflection point relative to said band plan; and
    providing an extended band plan by causing any bands occurring within a filterable separation of said reflection point to be symmetric thereabout to filter images for communicating in said communications system.

8. The method as recited in claim 7 wherein said any bands are symmetrically adjustable about said reflection point.

9. The method as recited in claim 7 further comprising repeating said selecting and said causing to yield an extended band plan having multiple reflection points.

10. The method as recited in claim 7 wherein said reflection point is selected based on a digital subscriber line transmission standard.

11. A band plan extension generator for providing an extended band plan with reduced filtering requirements for a DSL system, comprising:
    a reflection point selector configured to select a reflection point relative to extending said band plan; and
    an extension band adjuster coupled to said reflection point selector and configured to cause any bands occurring within a filterable separation of said reflection point to be symmetric thereabout, thereby filtering images for communicating in said DSL system.

12. A method of generating a band plan with reduced filtering requirements for communicating in a communications system, comprising:
    selecting a reflection point; and
    causing transitions between bands occurring within a filterable separation of said reflection point to be symmetric thereabout for filtering images for communicating in said communications system.

13. The method as recited in claim 12 further comprising repeating said selecting and said causing to yield a band plan having multiple reflection points with corresponding multiple transitions between bands.

14. The method as recited in claim 13 wherein at least two of said corresponding multiple transitions between bands are symmetrically adjustable thereby accommodating different transmission biases.

15. A band plan generator for providing a band plan with reduced filtering requirements for communicating in a DSL system, comprising:
    a reflection point selector configured to select a reflection point; and
    a band transition manipulator coupled to said reflection point selector and configured to cause transitions between bands occurring within a filterable separation of said reflection point to be symmetric thereabout, thereby filtering images to yield said band plan for communicating in said DSL system.

* * * * *